April 14, 1959 S. CAMPANELL Re. 24,631

SAFETY LIGHT ASSEMBLY

Original Filed April 24, 1957

INVENTOR:
SAMUEL CAMPANELL
BY Howson & Howson
ATTYS.

United States Patent Office

Re. 24,631

Reissued Apr. 14, 1959

24,631

SAFETY LIGHT ASSEMBLY

Samuel Campanell, Brigantine, N.J., assignor to Bowers Battery and Spark Plug Co., Reading, Pa., a corporation of Pennsylvania Original No. 2,816,284, dated December 10, 1957, Serial No. 654,824, April 24, 1957. Application for reissue October 22, 1958, Serial No. 770,880

4 Claims. (Cl. 340—321)

Matter enclosed in heavy brackets [ ] appears in the original patent but forms no part of this reissue specification; matter printed in italics indicates the additions made by reissue.

The present invention relates to safety lights, and has particular application to a self-contained unit which is adapted to be mounted on the hat of a hunter to warn other hunters of the presence of human life.

Hunting accidents frequently occur at dusk when it is difficult to recognize human shapes. Sometimes at the end of a day of hunting, careless hunters will shoot at anything that moves in order to avoid returning home empty handed. Therefore, at dusk, when hunters are coming from the woods, their lives are in extreme danger from such careless hunters. The present invention affords a degree of safety by providing artificial light which informs the careless hunter that the movement is caused by human activity.

With the foregoing in mind, a primary object of the present invention is to provide a light mounted in a self-contained unit which may be worn by a hunter and which operates to exhibit a flickering illumination.

More specifically, the invention contemplates a light source mounted on a resilient flexible support which therefore oscillates or wobbles in response to normal movement occurring upon displacement of the unit.

The invention also provides a light having the above characteristics which is highly economical to manufacture and which may also serve as a novelty attachment for youngsters and afford them some degree of protection when walking or riding bicycles at night or in dim light.

All of the objects of the present invention and the various features and details of the construction and operation thereof are more fully set forth hereinafter with reference to the accompanying drawings in which.

Figure 1:
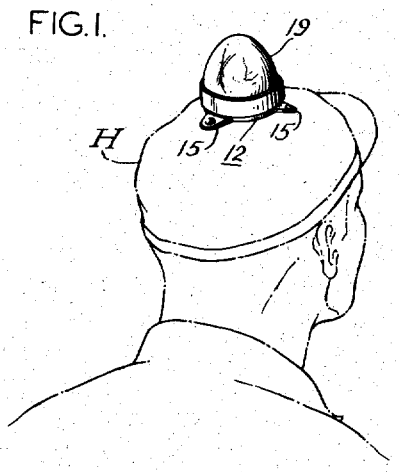
Fig. 1 is a thumb nail sketch of a safety light unit made in accordance with the present invention mounted on the cap of a hunter.

In the illustrated embodiment of the present invention, the unit comprises a base member 12 which is provided with a cylindrical recess as indicated at 13 to receive an electrical assembly 14. The member 12 is provided with a plurality, in the present instance three, lugs or ears 15 at spaced intervals about its circumference. The ears are provided with fastening elements 16 for securing the member 12 to the hat. In the illustrated form of the invention, the fastening elements 16 comprise snaps which register with corresponding snaps mounted in the hat H as shown in Fig. 1. The member 12 is threaded as indicated at 18 to engage a translucent dome 19 which encloses the assembly 14 and protects the same against the weather. In the present instance, it is contemplated that the dome 19 and the base member 12 be fabricated of a suitable plastic material which may be tinted red, frosted, or made clear.

Figure 2:
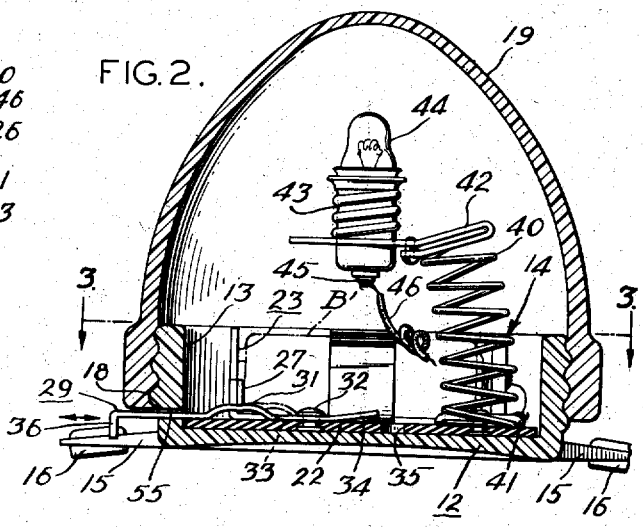
Fig. 2 is a transverse section through the unit showing the construction thereof.
Figure 5:
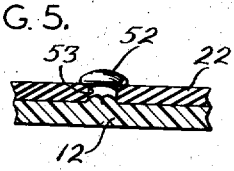
Fig. 5 is an enlarged sectional view taken on the line 5—5 of Fig. 3.

The electrical assembly 14 of the present embodiment of the invention comprises an insulating base 22 adapted to be received in the member 12. In the present instance, the base is formed of cardboard or similar material. Mounted on the base 22 are two battery clips 23 and 24 which are adapted to receive batteries, as indicated in broken lines at B and B′ in Figs. 2 and 3. The battery clips 23 and 24 are formed of conductive material and are provided at one end with contact buttons 25 and 26 respectively which are insulated from the clips 23 and 24. At the opposite ends of the clips, arms 27 and 28 respectively project toward one another into closely spaced relation. A switch arm 29 is provided to electrically connect and disconnect the arms 27 and 28 to respectively complete and interrupt the circuit embodied in the assembly 14. In the present instance, the switch arm 29 is mounted for longitudinal movement between the position shown in full lines in Figs. 2 to 4 inclusive and the position shown in broken lines in Fig. 2. As shown, the arm has an arcuate section 31 which is operable to engage the arms 27 and 28 and effect electrical connection therebetween. The arm is mounted for longitudinal movement by a pin 32 projecting upwardly from the insulating base 22 and passing through a slot 33 in the arm. A detent 34 is provided at the inner end of the arm 29 to engage in an aperture 35 in the base 22 to lock the arm in its innermost position which opens the electrical circuit. The outer extremity of the arm 29 is turned down as indicated at 36 to constitute an operation for the switch.

Means is provided to resiliently and flexibly support a lamp on the base 22. To this end, an elongated helical spring element 40 is mounted on the base 22, for example by an element 41. The upper end of the spring 40 mounts a conductive strip 42 which has mounted thereon a conventional socket 43 for receiving a lamp bulb 44. The socket 43 has a conventional contact 45 embodied therein for contacting the center button of the bulb 44.

Figure 3:
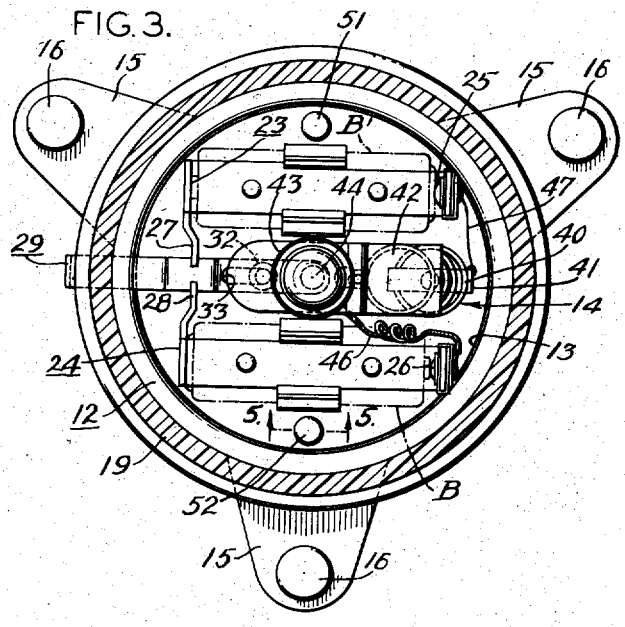
Fig. 3 is a sectional view taken on the line 3—3 of Fig. 2.
Figure 4:
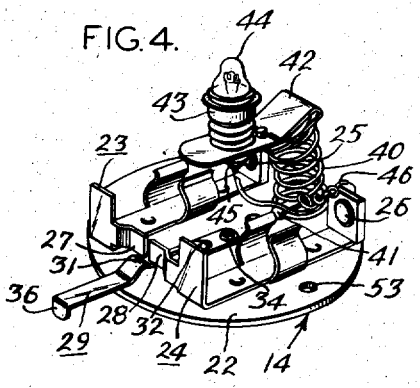
Fig. 4 is a detached perspective view of the operating components of the unit.

Means is provided to electrically connect the socket 43 and contact 45 with the contacts 25 and 26 of the battery clips 23 and 24. To this end, a flexible conductor 46 is connected directly from the contact 45 to the contact button 26, as shown in Figs. 3 and 4. The conductor 46 is sufficiently flexible to afford free movement of the socket 43 relative to the clip 24. Electrical connection from the contact button 25 to the socket housing 43 is afforded by a conductor 47 connected between the contact 25 and the clip 41. The spring 40 and the strip 42 are of electrically conductive material so as to afford current flow to energize the lamp bulb 44 when the switch arm 29 is in its full-line position.

Thus, the electrical circuit for the assembly 14 starts at the lamp 44, passes through the contact 45, the conductor 46, the contact button 26, the battery B, the clip arm 28, the switch arm 29, the clip arm 27, the battery B, the contact button 25, the conductor 47, the element 41, the spring 40, the strip 42, and the housing 43 back to the lamp 44. The batteries B and B′ constitute the source of voltage for the circuit. The circuit is complete when the switch arm 29 is in its illustrated full-line position, and is interrupted when the arm 29 is displaced inwardly to the broken line position shown in Fig. 2.

The flexible resilient support for the lamp 44, afforded by the spring 40 and the flexible connector 46 allow the strip 42 to move freely thereby allowing the lamp to oscillate on the spring 40. The oscillation of the lamp within the dome 19 causes a flickering or wobbling light to be apparent. The resiliency of the spring is such that when the housing is moved, as in normal walking, the lamp is caused to oscillate and present a flickering appearance.

The assembly 14 is mounted in the base member 12 by means of posts 51 and 52 projecting upwardly from the base member through apertures 53 on opposite sides of the insulating member 22. The tops of the posts 51 and 52 are peened over or fused to be enlarged and retain the assembly 14 in place in the base 12. The base 12 is also provided with an aperture 55 which slidably receives the arm 29 and affords longitudinal movement thereof.

While a particular embodiment of the present invention has been herein illustrated and described, it is not intended to limit the invention to such a disclosure, but changes and modifications may be made therein and thereto within the scope of the following claims.

I claim:

1. A safety light unit comprising a base member and a translucent dome, means to secure said base member to an article of clothing, means for mounting a source of voltage in said base member, a socket for a lamp bulb, a resilient flexible support mounting said socket within said dome upon said base member to thereby afford oscillation of said socket relative to said base member, and electrical connections completing a circuit to said lamp socket and including said voltage source mounting means to afford energization of a lamp mounted in said socket by a voltage source in said mounting means, said electrical connections including a switch means operable in one position to close said circuit and in a second position to open said circuit, said switch means having an operator projecting exteriorly of said base member.

2. In a safety lamp unit, a base adapted to be mounted on an article of clothing, a cylindrical helical spring mounted at one end on said base and projecting upwardly therefrom, said spring being of electrically conductive material, an electrically conductive strip mounted on the upper end of said spring and projecting laterally therefrom, a lamp socket rigidly mounted in the laterally projecting portion of said strip and having its cylindrical shell electrically connected thereto, a central contact in said shell electrically insulated therefrom, and means to apply a voltage potential between said contact and the base of said spring and operable to afford free oscillatory movement of said strip and socket upon movement of said base, whereby said socket oscillates when said article of clothing is moved as in normal walking.

3. A device according to claim 2 wherein said circuit means includes a switch element mounted on said base to selectively complete and interrupt the circuit to said socket.

*4. A safety light unit comprising a base member and a translucent dome mounted on said base member to define an enclosure, means for mounting a source of voltage in said enclosure, a socket for a lamp bulb, a resilient flexible support mounting said socket within said enclosure upon said base member and affording free oscillation of said socket relative to said base member, and electrical connections completing a circuit to said lamp socket and including said voltage source mounting means to afford energization of a lamp mounted in said socket by a voltage source in said mounting means, said electrical connections including a switch means in said enclosure operable in one position to close said circuit and in a second position to open said circuit.*

References Cited in the file of this patent or the original patent

UNITED STATES PATENTS

| | | |
|---|---|---|
| 1,737,398 | Ackerman | Nov. 26, 1929 |
| 2,734,125 | Morris | Feb. 7, 1956 |

FOREIGN PATENTS

| | | |
|---|---|---|
| 184,302 | Great Britain | Aug. 17, 1922 |